(12) United States Patent
Chen et al.

(10) Patent No.: US 8,756,432 B1
(45) Date of Patent: Jun. 17, 2014

(54) SYSTEMS AND METHODS FOR DETECTING MALICIOUS DIGITALLY-SIGNED APPLICATIONS

(75) Inventors: Joseph Chen, Los Angeles, CA (US); Rui Jing, Chengdu (CN)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/477,580

(22) Filed: May 22, 2012

(51) Int. Cl.
*G06F 21/00* (2013.01)
(52) U.S. Cl.
USPC ........... 713/188; 713/187; 713/193; 713/194; 726/22; 726/23; 726/24; 726/25
(58) Field of Classification Search
CPC ....................................................... H04L 9/00
USPC ............... 713/187–188, 193–194; 726/22–25
See application file for complete search history.

(56) References Cited

U.S. PATENT DOCUMENTS

| 7,685,425 | B1 * | 3/2010 | Wright et al. .................. | 713/176 |
| 2005/0246534 | A1 * | 11/2005 | Kirkup et al. .................. | 713/170 |
| 2007/0239993 | A1 * | 10/2007 | Sokolsky et al. .............. | 713/188 |
| 2013/0097659 | A1 * | 4/2013 | Das et al. ......................... | 726/1 |
| 2013/0254880 | A1 * | 9/2013 | Alperovitch et al. ........... | 726/22 |

OTHER PUBLICATIONS

Mario Ballano; Android.Bgserv Found on Fake Google Security Patch; Symantec Blog; Mar. 10, 2011; http://www.symantec.com/connect/blogs/androidbgserv-found-fake-google-security-patch.
Mario Ballano; Android.Bgserv Found on Fake Google Security Patch—Part II; Symantec Blog; Mar. 10, 2011; http://www.symantec.com/connect/blogs/androidbgserv-found-fake-google-security-patch-part-ii.
Joji Hamada; New Android Threat Gives Phone a Root Canal; Symantec Blog; 2 Mary 2011; http://www.symantec.com/connect/blogs/new-android-threat-gives-phone-root-canal.
Apk Tool; Android—Apktool, A Tool for Reverse Engineering Android APK Files; Taken from site on May 22, 2012; http://code.google.com/p/android-apktool/.
Virustotal; Jun. 27, 2011; http://www.virustotal.com/file-scan/report.html?id=ad785708e2f23c48dc8b3b088cedef5afc97759d5dc92103125a599657fca7fa-1309143478.
Aaron Li; Secuirty Alert; Yet Another Repackaged Trojan "Fake10086" Leaks User Privacy; AegisLab Security Blog; Mar. 4, 2011; http://blog.aegislab.com/index.php?op=ViewArticle&articleId=81&blogId=1.
C. Enrique Ortiz; Understanding Security on Android; IBM DeveloperWorks; Nov. 16, 2010; http://www.ibm.com/developerworks/xml/library/x-androidsecurity/index.html.

* cited by examiner

*Primary Examiner* — Thanhnga B Truong
*Assistant Examiner* — Josnel Jeudy
(74) *Attorney, Agent, or Firm* — ALG Intellectual Property, LLC (57) ABSTRACT

A computer-implemented method for detecting malicious digitally-signed applications. The method may include 1) identifying an application package file that has been digitally signed, wherein the application package file is used to distribute an application, 2) comparing the application package file to a set of known application package files, 3) determining that the application package file has been repackaged from a known application package file, 4) comparing a public key associated with a digital signature of the application package file to a public key associated with a digital signature of the known application package file, 5) determining that the public key associated with the digital signature of the application package file and the public key associated with the digital signature of the known application package file are different, and 6) performing a security action on the application. Various other methods, systems, and computer-readable media are also disclosed.

20 Claims, 7 Drawing Sheets

Application-Package-File Information
500

--------------------------------------------------------------------------------
**************************************************
File Name: AngryBirds_2.1.1.apk
**************************************************
**************************************************
Package Name: Com.Angrybirds
**************************************************
**************************************************
Number of class files: 503
**************************************************
**************************************************
Number of Resource Files: 20
Resource Files Size: 14 MB
**************************************************
--------------------------------------------------------------------------------

SYSTEMS AND METHODS FOR DETECTING MALICIOUS DIGITALLY-SIGNED APPLICATIONS

BACKGROUND

Consumers and businesses increasingly rely on computing devices (e.g., smartphones, tablets, laptops, etc.) to store and manage sensitive data. Consequently, malicious programmers seem to continuously increase their efforts to gain illegitimate control and access to these computing devices through the use of viruses, Trojan horses, worms, and other programs meant to compromise computer systems and data belonging to other people. These malicious programs are often referred to as malware.

Repackaging legitimate popular applications is a common malware distribution technique whereby a malicious programmer adds malicious code to a legitimate application and then distributes the repackaged application as thought it were the original legitimate application.

On some computing platforms, an application may be distributed to users using application package files that contain the code, data, and resources that make up the application. For example, applications created for mobile devices (e.g., ANDROID, IOS, and WINDOWS PHONE devices) may be distributed as application package files that users can download and install on their mobile devices. On such platforms, a malicious programmer may be able to obtain an application package file of an already popular application, unpack it, and add malicious code to the application contained within the application package file. The malicious programmer may then repackage the now malicious application and distribute it to users as if it were the original popular application. Some examples of malware created and distributed using this repackaging technique may include DroidDream, Gemini, and the fake ANDROID MARKET Security tool.

Unfortunately, it may be difficult for a user to determine whether an application is legitimate or whether it is malicious and has been repackaged from another application because repackaged applications may have the same functionality as the original application from which it has been repackaged. For this reason, a user may be able to download, install, and run a repackaged application without any indication that the repackaged application is malicious. Accordingly, the instant disclosure addresses a need for additional and improved systems and methods for detecting malicious digitally-signed applications.

SUMMARY

As will be described in greater detail below, the instant disclosure generally relates to systems and methods for detecting malicious digitally-signed applications by identifying a digitally-signed application package file (e.g., an ANDROID application package (APK) file) that has been repackaged from a known digitally-signed application package file and by determining that the digitally-signed application package file has not been digitally signed using the same private key as that used to sign the known digitally-signed application package file.

In one example, a computer-implemented method for detecting malicious digitally-signed applications may include 1) identifying an application package file that has been digitally signed and that is used to distribute an application, 2) comparing the application package file to a set of known application package files, 3) based on the comparison of the application package file to the set of known application package files, determining that the application package file has been repackaged from a known application package file, 4) in response to determining that the application package file has been repackaged from the known application package file, comparing a public key associated with a digital signature of the application package file to a public key associated with a digital signature of the known application package file, 5) based on the comparison of the public keys, determining that the public key associated with the digital signature of the application package file and the public key associated with the digital signature of the known application package file are different, and 6) in response to determining that the public keys are different, performing a security action on the application.

In one embodiment, the step of comparing the application package file to the set of known application package files may include comparing at least one attribute of the application package file with at least one attribute of the known application package file, and the step of determining that the application package file has been repackaged from the known application package file may include determining that the application package file is similar to the known application package file based at least in part on the comparison of the attribute of the application package file with the attribute of the known application package file.

In one embodiment, the step of determining that the application package file is similar to the known application package file may include 1) calculating, based at least in part on the comparison of the attribute of the application package file with the attribute of the known application package file, a similarity score that indicates a degree of similarity between the attribute of the application package file with the attribute of the known application package file and 2) determining that the similarity score is greater than a predetermined similarity threshold.

In some embodiments, the attribute of the application package file may include a name of the application, a name of the application package file, a package name of the application, a name of an activity of the application, a name of a class of the application, an attribute of a file contained within the application package file, a name of a resource file contained within the application package file, a size of the resource file, a hash of the resource file, a number of resource files contained within the application package file, a size of the resource files, a number of class files contained within the application package file, and/or a size of the class files.

In various embodiments, the step of performing the security action on the application may include performing a security action on the application package file, performing a security action on the public key associated with the application package file, and/or performing a security action on at least one additional application that has been signed using a private key associated with the public key associated with the application package file.

In other embodiments, the step of performing the security action on the application may include classifying the application as potentially malicious, preventing an installation of the application, notifying a user who is attempting to install the application that the application is potentially malicious, and/or notifying a third-party that the application is potentially malicious.

In some embodiments, the application package file may include an ANDROID application package file, a JAVA archive file, and/or a ZIP file.

In one embodiment, a system for implementing the above-described method may include an identification module programmed to 1) identify an application package file that has been digitally signed and that is used to distribute an application, 2) a file-comparing module programmed to compare the application package file to a set of known application package files, 3) a similarity-determining module programmed to, based on the comparison of the application package file to the set of known application package files, determine that the application package file has been repackaged from a known application package file, 4) a key-comparing module programmed to, in response to determining that the application package file has been repackaged from the known application package file, compare a public key associated with a digital signature of the application package file to a public key associated with a digital signature of the known application package file, 5) a difference-determining module programmed to, based on the comparison of the public keys, determine that the public key associated with the digital signature of the application package file and the public key associated with the digital signature of the known application package file are different, 6) a security module programmed to, in response to determining that the public keys are different, perform a security action on the application, and/or at least one processor configured to execute the identification module, the file-comparing module, the similarity-determining module, the key-comparing module, the difference-determining module, and the security module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify an application package file that has been digitally signed and that is used to distribute an application, 2) compare the application package file to a set of known application package files, 3) based on the comparison of the application package file to the set of known application package files, determine that the application package file has been repackaged from a known application package file, 4) in response to determining that the application package file has been repackaged from the known application package file, compare a public key associated with a digital signature of the application package file to a public key associated with a digital signature of the known application package file, 5) based on the comparison of the public keys, determine that the public key associated with the digital signature of the application package file and the public key associated with the digital signature of the known application package file are different, and 6) in response to determining that the public keys are different, perform a security action on the application.

As will be explained in greater detail below, by identifying a digitally-signed application package file that has been repackaged from a known digitally-signed application package file but that has not been digitally signed using the same private key as that used to sign the known digitally-signed application package file, the systems and methods described herein may detect a malicious digitally-signed application contained within the digitally-signed application package file. Furthermore, in some examples, by detecting malicious digitally-signed applications, these systems and methods may prevent malicious programmers from gaining illegitimate control and access to computing devices, thereby preventing the loss of sensitive data.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 1:
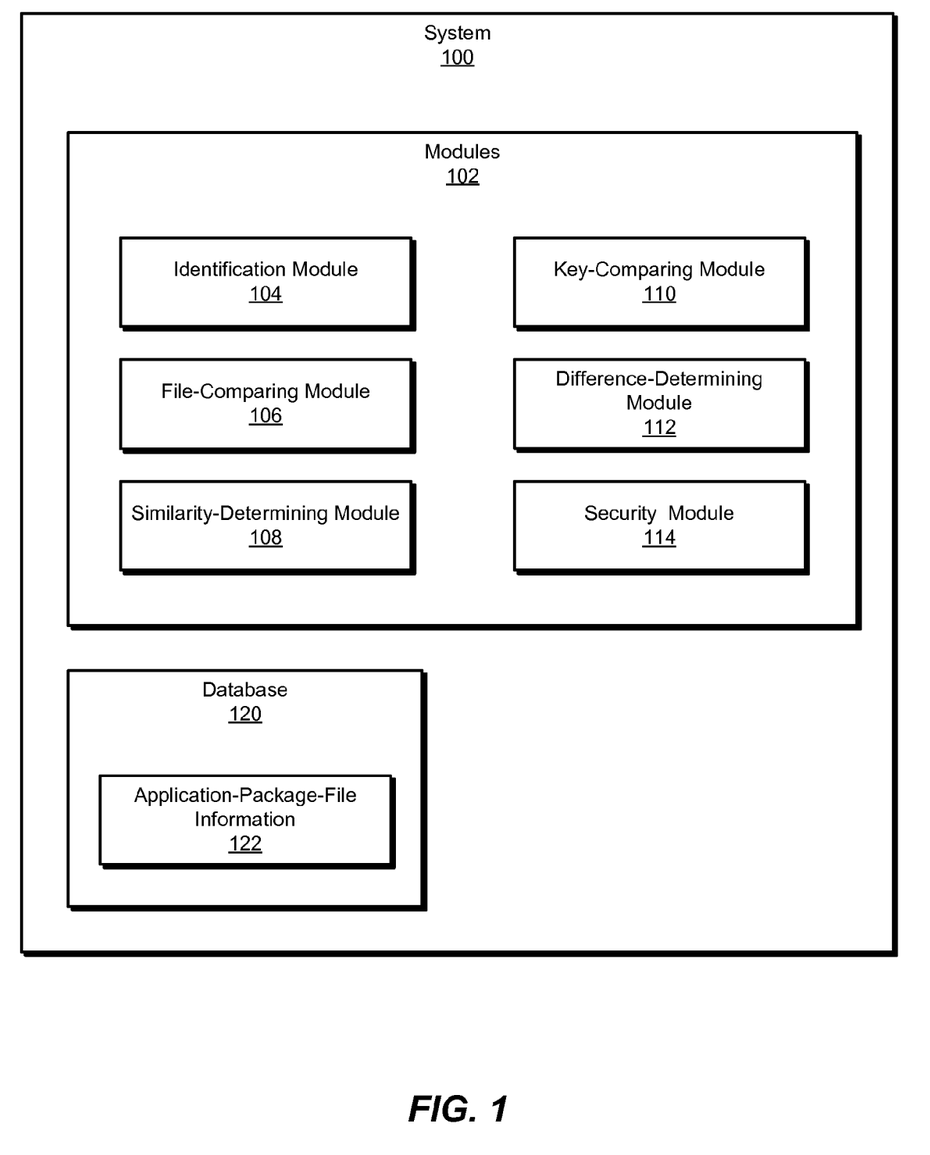
FIG. 1 is a block diagram of an exemplary system for detecting malicious digitally-signed applications.
Figure 2:
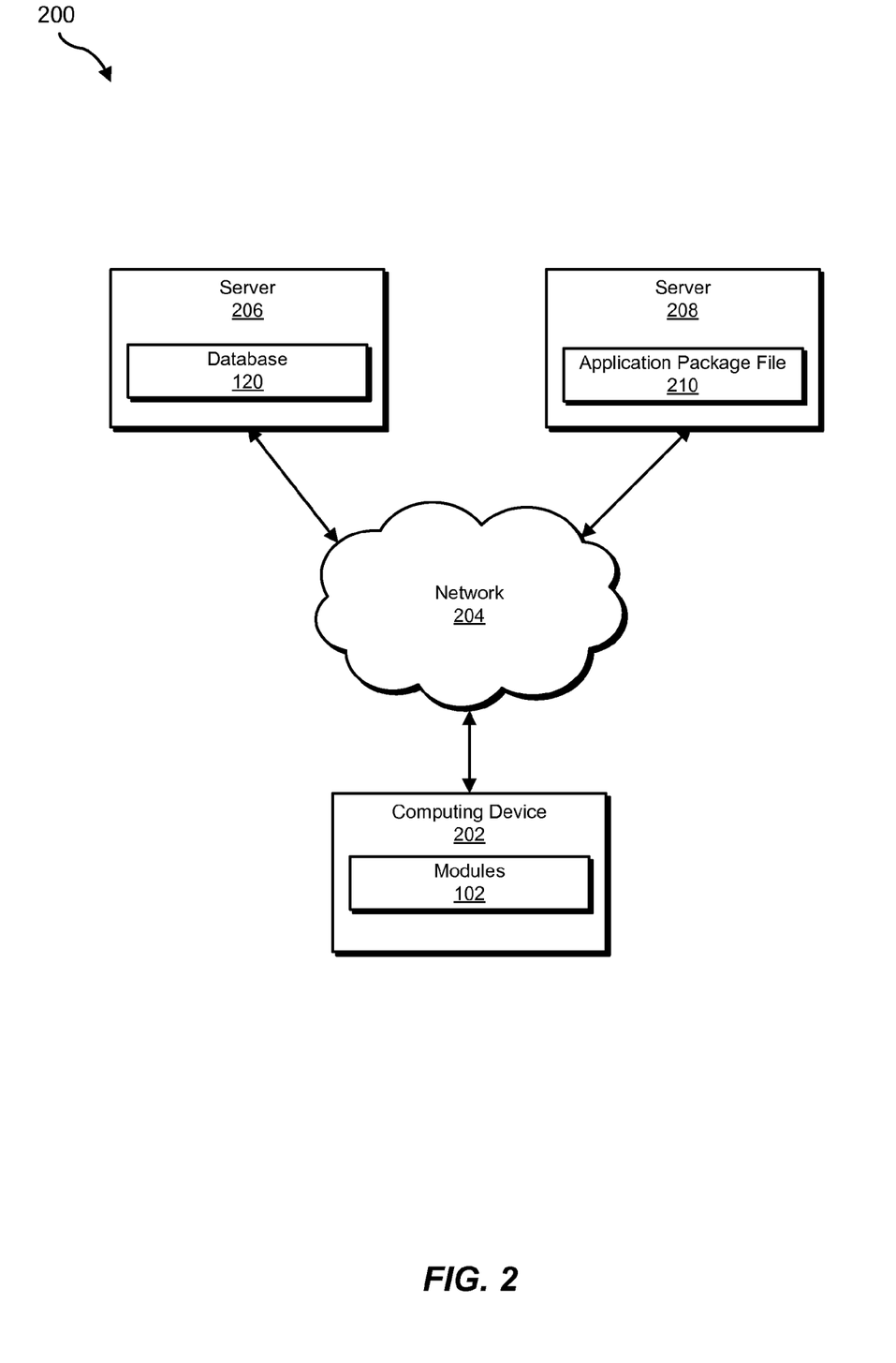
FIG. 2 is a block diagram of an exemplary system for detecting malicious digitally-signed applications.

The following will provide, with reference to FIGS. 1-2, detailed descriptions of exemplary systems for detecting malicious digitally-signed applications. Detailed descriptions of corresponding computer-implemented methods will also be provided in connection with FIG. 3. In addition, detailed descriptions of exemplary application-package-file information will be provided in connection with FIGS. 4-5. Furthermore, detailed descriptions of an exemplary computing system and network architecture capable of implementing one or more of the embodiments described herein will be provided in connection with FIGS. 6 and 7, respectively.

FIG. 1 is a block diagram of an exemplary system 100 for detecting malicious digitally-signed applications. As illustrated in this figure, exemplary system 100 may include one or more modules 102 for performing one or more tasks. For example, and as will be explained in greater detail below, exemplary system 100 may include an identification module 104 programmed to identify an application package file that has been digitally signed and that is used to distribute an application. Exemplary system 100 may also include a file-comparing module 106 programmed to compare the application package file to a set of known application package files.

Additionally, exemplary system 100 may include a similarity-determining module 108 programmed to determine that the application package file has been repackaged from a known application package file. Exemplary system 100 may also include a key-comparing module 110 programmed to compare a public key associated with a digital signature of the application package file to a public key associated with a digital signature of the known application package file.

In addition, and as will be described in greater detail below, exemplary system 100 may include a difference-determining module 112 programmed to determine that the public key associated with the digital signature of the application package file and the public key associated with the digital signature of the known application package file are different. Exemplary system 100 may also include a security module 114 programmed to perform a security action on the application. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store application-package-file information 122 (an example of which includes known-application-package-file information 400 in FIG. 4).

Database 120 may represent portions of a single database or computing device or a plurality of databases or computing devices. For example, database 120 may represent a portion of computing device 202 and/or server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as computing device 202 and/or server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 and a server 208 via a network 204. As illustrated, computing device 202 may include one or more of modules 102, and server 206 may include any data from database 120. Although not illustrated in FIG. 2, computing device 202 may also include any data from database 120, and server 206 may include one or more of modules 102. This or another alternative configuration may be used to conserve resources on computing device 202 (e.g., battery and network resources). As shown in FIG. 2, server 208 may include an application package file 210 that may be used to distribute an application to one or more computing devices (e.g., computing device 202). In at least one example, server 208 may represent a server hosting applications and/or application package files as part of an application marketplace.

In one embodiment, one or more of modules 102 from FIG. 1 may, when executed by at least one processor of computing device 202, enable computing device 202 to detect malicious digitally-signed applications. For example, and as will be described in greater detail below, one or more of modules 102 may cause computing device 202 to 1) identify an application package file that has been digitally signed and that is used to distribute an application, 2) compare the application package file to a set of known application package files, 3) based on the comparison of the application package file to the set of known application package files, determine that the application package file has been repackaged from a known application package file, 4) in response to determining that the application package file has been repackaged from the known application package file, compare a public key associated with a digital signature of the application package file to a public key associated with a digital signature of the known application package file, 5) based on the comparison of the public keys, determine that the public key associated with the digital signature of the application package file and the public key associated with the digital signature of the known application package file are different, and 6) in response to determining that the public keys are different, perform a security action on the application.

Computing device 202 generally represents any type or form of computing device capable of reading computer-executable instructions. Examples of computing device 202 include, without limitation, laptops, tablets, desktops, servers, smartphones, cellular phones, personal digital assistants (PDAs), multimedia players, embedded systems, combinations of one or more of the same, exemplary computing system 610 in FIG. 6, or any other suitable computing device.

Server 206 and server 208 generally represent any type or form of computing device that is capable of reading computer-executable instructions. Examples of server 206 and server 208 include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 700 in FIG. 7, or the like. Network 204 may facilitate communication or data transfer using wireless or wired connections. In one embodiment, network 204 may facilitate communication between computing device 202, server 206, and/or server 208.

Figure 3:
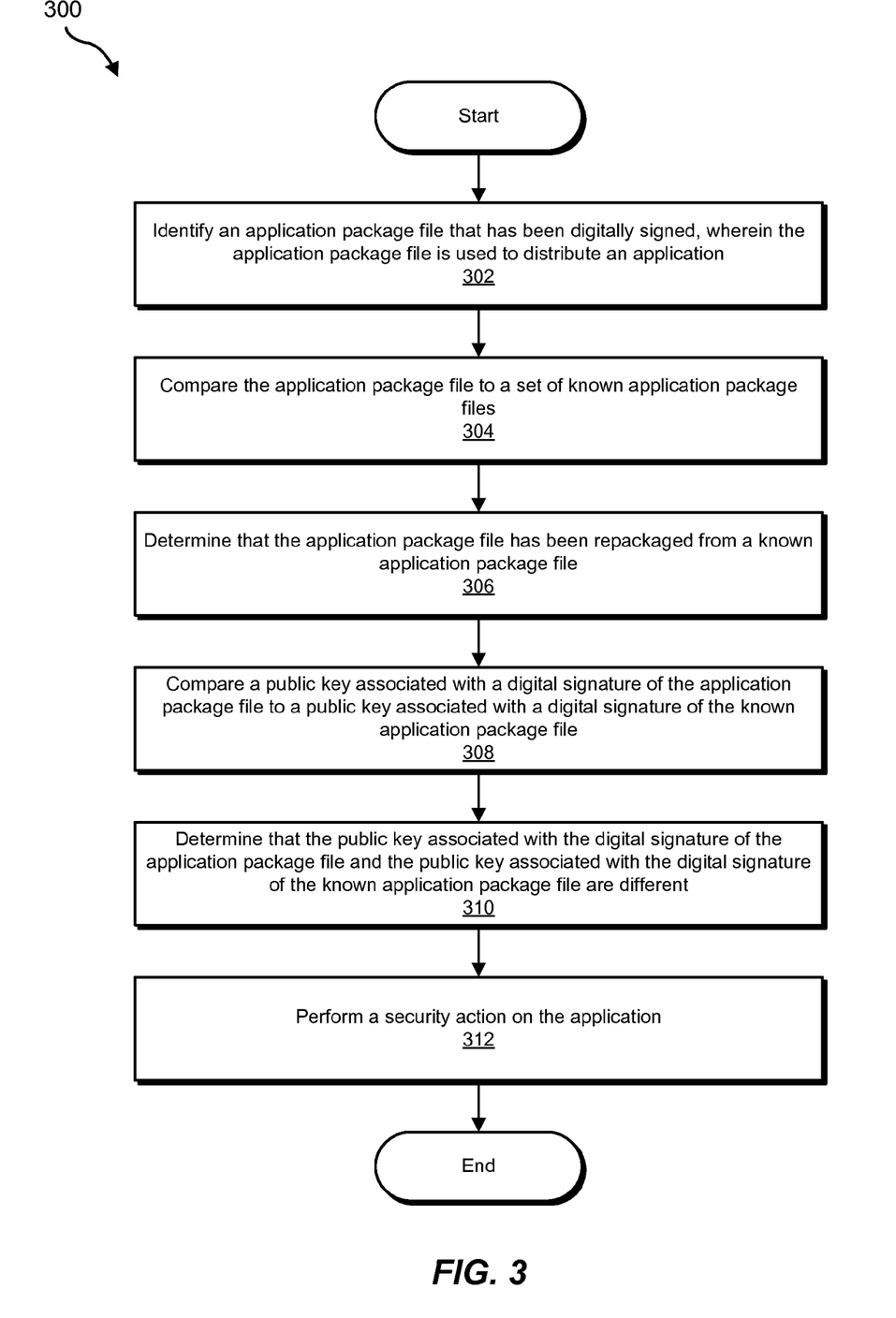
FIG. 3 is a flow diagram of an exemplary method for detecting malicious digitally-signed applications.

FIG. 3 is a flow diagram of an exemplary computer-implemented method 300 for detecting malicious digitally-signed applications. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

At step 302, one or more of the systems described herein may identify an application package file that has been digitally signed. The application package file may be used to distribute an application. For example, at step 302, identification module 104 may, as part of computing device 202 in FIG. 2, identify application package file 210 that has been digitally signed and that is used to distribute an application.

The systems described herein may perform step 302 in any suitable manner. For example, identification module 104 may identify the application package file as part of an application running on computing device 202. In one example, identification module 104 may identify the application package file as (or before) it is downloaded to computing device 202 (e.g., via an application-marketplace application, an email, or a website). For example, identification module 104 may identify application package file 210 as it is downloaded to computing device 202 from server 208.

In other examples, identification module 104 may identify the application package file in response to a request to install the application contained within the application package file. In another example, identification module 104 may identify the application package file as a user views information about the application contained within the application package file (e.g., using an application-marketplace application, such as GOOGLE PLAY).

Additionally and/or alternatively, identification module 104 may identify the application package file as part of an application running on server 206. For example, identification module 104 may identify the application package file while monitoring applications presented and/or made available through an application and/or application-package-file marketplace (e.g., GOOGLE PLAY, AMAZON APP STORE, GETJAR, etc.). In another example, identification module 104 may identify the application package file in response to a request for security information associated with the application contained within the application package file.

Identification module 104 may identify a variety of application-package-file types. For example, identification module 104 may identify ANDROID application package (APK) files that are used to distribute ANDROID applications, JAVA archive (JAR) files that are used to distribute applications that run on the JAVA platform, ZIP files (e.g., an IPHONE application archive (IPA) file or a WINDOWS PHONE application file), and/or any other file that may be used to distribute an application.

As used herein, the term "application package file" may generally refer to any file that may be used to distribute an application and that may be digitally signed. For example, the application package file AngryBirds_2.1.1.apk may be used to distribute the application ANGRY BIRDS.

On some computing platforms, an application and/or application package file in which the application is contained may be required to be digitally signed prior to its distribution. The process of digitally signing the application and/or the application package file may include 1) obtaining an asymmetric encryption key pair (e.g., a private key and a public key), 2) generating a digital signature for the application and/or the application package file using the private key and a suitable signature algorithm, and 3) associating the digital signature and the public key with the application and/or the application package file. This digital signature may later be used to verify the integrity and/or source of the application and/or the application package file using the public key. In at least one example, an application may be digitally signed when the application package file in which the application is contained is digitally signed.

As an illustration, applications developed for ANDROID computing devices may be packaged within an application package file and digitally signed prior to distribution. For example, upon creating an ANDROID application, a developer may prepare the application for distribution by 1) building the application (a process that may include compiling and packaging the application in an ANDROID application package (APK) file (e.g., a file with a .APK extension)), 2) digitally signing the APK file using a private encryption key (e.g., using a tool such as JARSIGNER), and 3) uploading the digitally-signed APK file to one or more application marketplaces.

At step 304, one or more of the systems described herein may compare the application package file to a set of known application package files. For example, at step 304, file-comparing module 106 may, as part of computing device 202 in FIG. 2, compare the application package file identified as part of step 302 to a set of known application package files (e.g., application package files of popular applications that are known to be free of malware).

The systems described herein may perform step 304 in any suitable manner. In one example, file-comparing module 106 may determine a signature of the application package file (e.g., one or more distinguishing characteristics of the application package file) and may compare the signature of the application package file with signatures of one or more known application package files. For example, file-comparing module 106 may compare the application package file to the set of known application package files by identifying and then comparing at least one attribute (e.g., application and/or application-package-file metadata) of the application package file with at least one attribute of at least one known application package file contained within the set of known application package files.

In one example, file-comparing module 106 may request from server 206 signatures of one or more known application package files that match and/or are similar to the signature of the application package file. In such an example, file-comparing module 106 may, after determining the signature of the application package file, transmit the signature of the application package file to server 206 so that it may be compared with the signatures of one or more known application package files contained within database 120.

In some examples, prior to comparing the application package file with the set of known application package files, file-comparing module 106 (e.g., as part of server 206 in FIG. 2) may gather information (e.g., application and/or application-package-file metadata) about one or more known application package files contained within the set of known application package files that file-comparing module 106 may compare with similar information about the application package file. In at least one example, file-comparing module 106 may record such information in database 120.

Examples of information that may be used by file-comparing module 106 to compare the application package file to the set of known application package files may include, without limitation, application identifiers (e.g., a name of an application), application-package-file identifiers (e.g., a file name of an application package file), application-package identifiers (e.g., a namespace of the application), a name of an activity of the application, a name of a class (e.g., a JAVA class) of the application, an attribute of a file (e.g., a file containing code, data, and/or resources) contained within the application package file, a name of a resource file (e.g., an image, sound, or video file) contained within the application package file, a size of the resource file, a hash of the resource file, a number of resource files contained within the application package file, a size of the resource files, a number of class files contained within the application package file, a size of the class files, a digital signature associated with the application package file, and/or a public key associated with the digital signature of the application package file.

Figure 4:
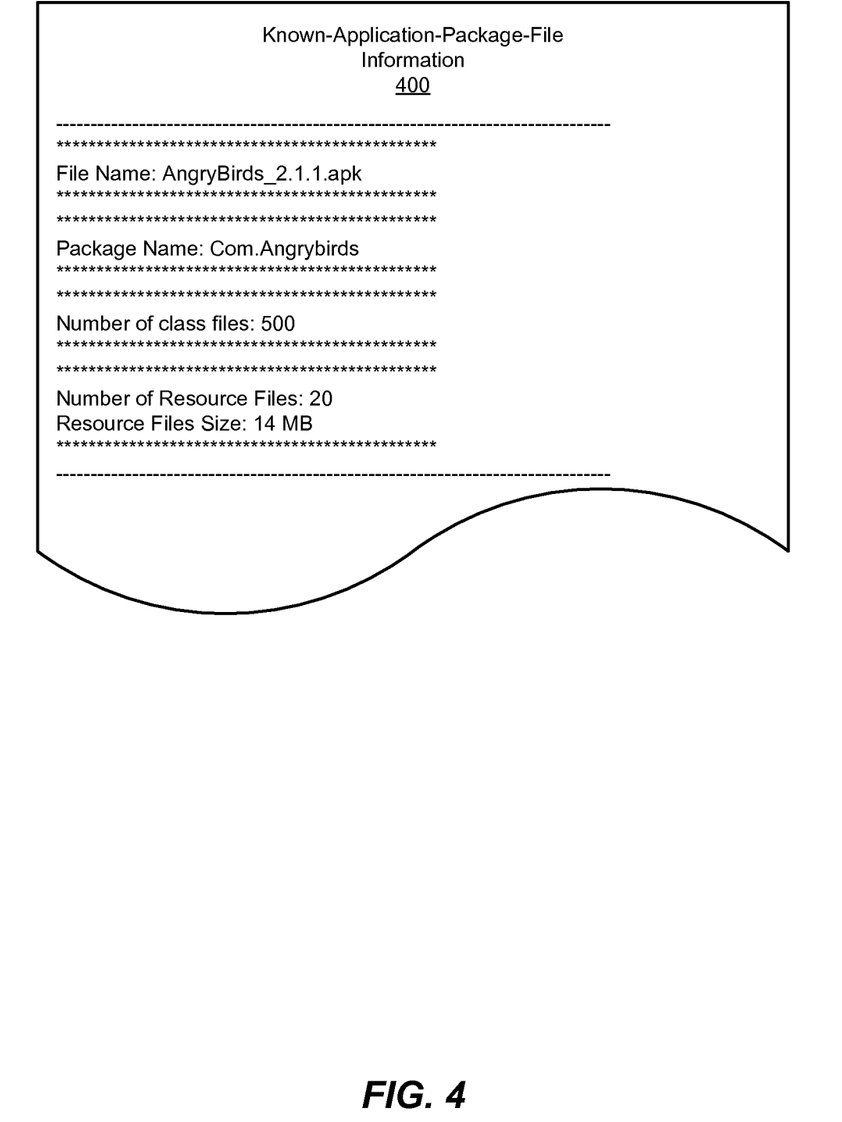
FIG. 4 is an illustration of exemplary application-package-file information.
Figure 5:
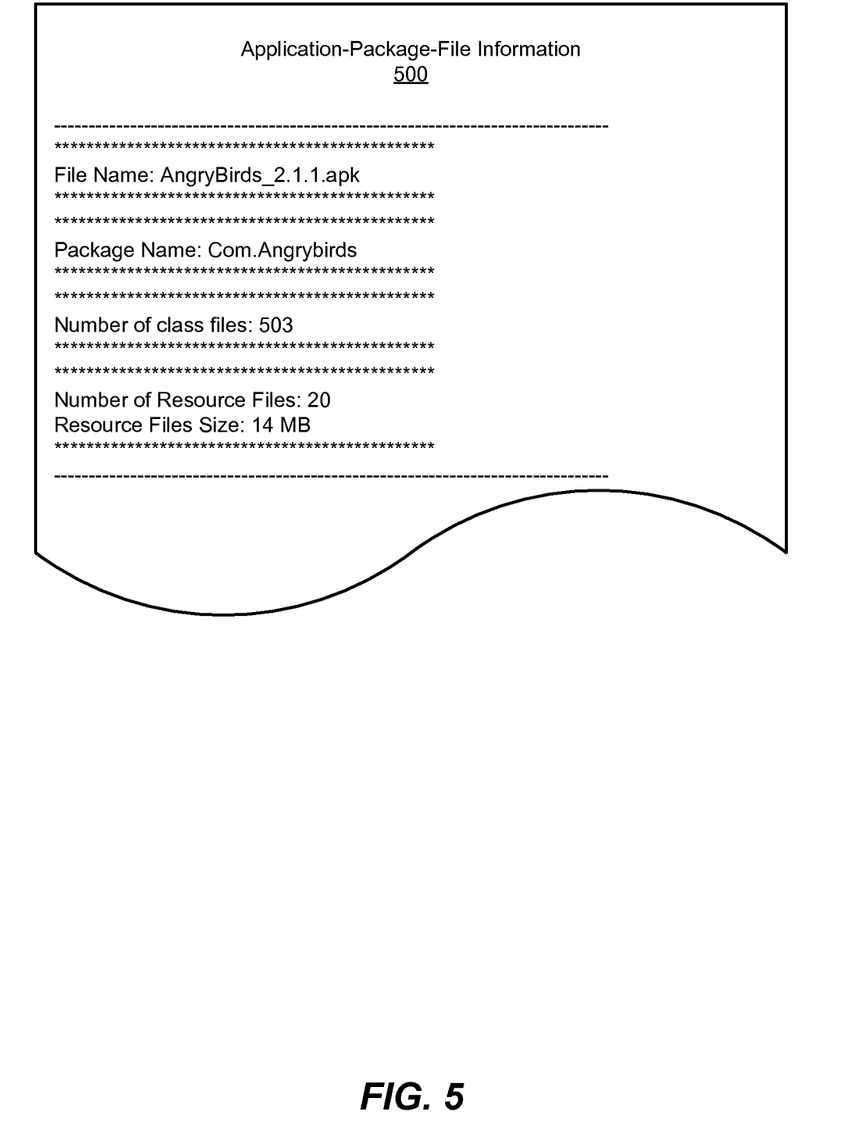
FIG. 5 is an illustration of exemplary application-package-file information.

FIGS. 4 and 5 illustrate exemplary application-package-file information that may be used by file-comparing module 106 to compare the application package file to a known application package file. FIG. 4 is an illustration of exemplary known-application-package-file information 400 associated with a known application (in this instance, the application ANGRY BIRDS). As illustrated in FIG. 4, known-application-package-file information 400 may include information that identifies a name of the known application package file containing the known application (e.g., AngryBirds_ 2.1.1.apk), a package name of the known application (e.g., Com.Angrybirds), a number of class files contained within the known application package file (e.g., 500 class files), a number of resource files contained within the known application package file (e.g., 20 resource files), and a size of the resource files (e.g., 14 MB).

FIG. 5 is an illustration of exemplary application-package-file information 500 associated with an application that may have been repackaged from the known application associated with known-application-package-file information 400 in FIG. 4. As illustrated in this figure, application-package-file information 500 may include information that identifies a name of the application package file containing the application (e.g., AngryBirds_2.1.1.apk), a package name of the application (e.g., Com.Angrybirds), a number of class files contained within the application package file (e.g., 503 class files), a number of resource files contained within the application package file (e.g., 20 resource files), and a size of the resource files (e.g., 14 MB).

Returning to FIG. 3, at step 306, one or more of the systems described herein may, based on the comparison of the application package file to the set of known application package files, determine that the application package file has been repackaged from a known application package file. For example, at step 306, similarity-determining module 108 may, as part of computing device 202 in FIG. 2, determine that the application package file associated with application-package-file information 500 in FIG. 5 has been repackaged from a known application package file associated with known-application-package-file information 400 in FIG. 4 based on the comparison made as part of step 304.

The systems described herein may perform step 306 in any suitable manner. In one example, similarity-determining module 108 may determine that the application package file has been repackaged from the known application package file by determining, based at least in part on the comparison performed as part of step 304, that the application package file is similar to the known application package file. For example, similarity-determining module 108 may determine that the application package file has been repackaged from the known application package file by determining that the signature of the application package file is the same as that of the known application package file from which it was repackaged.

In one example, similarity-determining module 108 may determine that the application package file has been repackaged from the known application package file by determining that the application package file contains the same resource files (e.g., image, sound, and video files) and/or the same functionality as the known application package file from which it was repackaged.

In another example, similarity-determining module 108 may determine that the application package file is similar to the known application package file by 1) calculating a similarity score that indicates a degree of similarity between an attribute of the application package file with an attribute of the known application package file and 2) determining that the similarity score is greater than a predetermined similarity threshold.

Similarity-determining module 108 may calculate the similarity score using any suitable algorithm and/or heuristic. For example, similarity-determining module 108 may calculate a similarity score using an algorithm that produces higher similarity scores when two application package files have the same attributes (e.g., when two application package files share the same resource files).

For example, as illustrated in FIGS. 4 and 5, the fact that known-application-package-file information 400 and application-package-file information 500 share the same application-package-file name (e.g., AngryBirds_2.1.1.apk), the same package name (e.g., Com.Angrybirds), the same number of resource files (e.g., 20 resource files), and the same size of the resource files (e.g., 14 MB) may indicate that the application package file associated with application-package-file information 500 in FIG. 5 has been repackaged from the known application package file associated with known-application-package-file information 400 in FIG. 4.

Upon determining that the application package file has been repackaged from a known application package file, the systems described herein may attempt to determine whether the repackaged application package file has been repackaged for a legitimate or malicious purpose (e.g., one legitimate reason why an application package file may have been repackaged may include updating the application contained within the application package file).

In some instances, in order to update an application contained within a repackaged application package file, the repackaged application package file may be required to be digitally signed using the same private key as the original application package file from which it was repackaged. For this reason, the fact that a digitally-signed repackaged application package file has not been digitally signed using the same private key as the digitally-signed application package file from which it was repackaged may indicate that the digitally-signed repackaged application package file is malicious.

At step 308, one or more of the systems described herein may, in response to determining that the application package file has been repackaged from the known application package file, compare a public key associated with a digital signature of the application package file to a public key associated with a digital signature of the known application package file. For example, at step 308, key-comparing module 110 may, as part of computing device 202 in FIG. 2, compare a public key associated with a digital signature of the application package file to a public key associated with a digital signature of the known application package file in response to the determination made as part of step 306.

The systems described herein may perform step 308 in any suitable manner. In one example, key-comparing module 110 may extract the public key associated with the digital signature of the application package file from the application package file and may compare it to the public key associated with the digital signature of the known application package file obtained from application-package-file information 122 located on server 206. In another example, key-comparing module 110 may obtain the public key associated with the digital signature of the application package file from server 206 or another source (e.g., a third party, such as, a certificate authority or an application-marketplace provider).

As an illustration, in the case of a digitally-signed ANDROID application package file, the application package file may include a signature block file that may include a digital signature associated with the application package file and a public key associated with the private key that was used to create the digital signature associated with the application package file. In this example, key-comparing module 110 may extract the public key from the signature block file and may compare the extracted public key with a public key extracted from the known application package file.

At step 310, one or more of the systems described herein may determine that the public key associated with the digital signature of the application package file and the public key associated with the digital signature of the known application package file are different. For example, at step 310, difference-determining module 112 may, as part of computing device 202 in FIG. 2, determine that the public key associated with the digital signature of the application package file and the public key associated with the digital signature of the known application package file are different.

The systems described herein may perform step 310 in any suitable manner. For example, difference-determining module 112 may determine that the public key associated with the digital signature of the application package file and the public key associated with the digital signature of the known application package file are different by verifying that the public key associated with the digital signature of the application package file is the public key associated with the private key that was used to generate the digital signature of the application package file and by determining that the public key associated with the digital signature of the application package file and the public key associated with the digital signature of the known application package file do not match.

At step 312, one or more of the systems described herein may perform a security action on the application. For example, at step 312, security module 114 may, as part of computing device 202 in FIG. 2, perform a security action on the application contained within the application package file.

The systems described herein may perform step 312 in any suitable manner. For example, security module 114 may perform the security action on the application by classifying the application as potentially malicious, by preventing an installation of the application, by notifying a user who is attempting to install the application that the application is potentially malicious, and/or by notifying a third-party (e.g., an application-marketplace provider) that the application is potentially malicious.

Additionally and/or alternatively, security module 114 may perform the security action on the application by performing a similar security action on the application package file, the public key associated with the application package file, and/or at least one additional application that has been signed using the same private key as that used to sign the application package file. Upon completion of step 312, exemplary method 300 in FIG. 3 may terminate.

As explained above, by identifying a digitally-signed application package file that has been repackaged from a known digitally-signed application package file but that has not been digitally signed using the same private key as that used to sign the known digitally-signed application package file, the systems and methods described herein may detect a malicious digitally-signed application contained within the digitally-signed application package file. Furthermore, in some examples, by detecting malicious digitally-signed applications, these systems and methods may prevent malicious programmers from gaining illegitimate control and access to computing devices, thereby preventing the loss of sensitive data.

Figure 6:
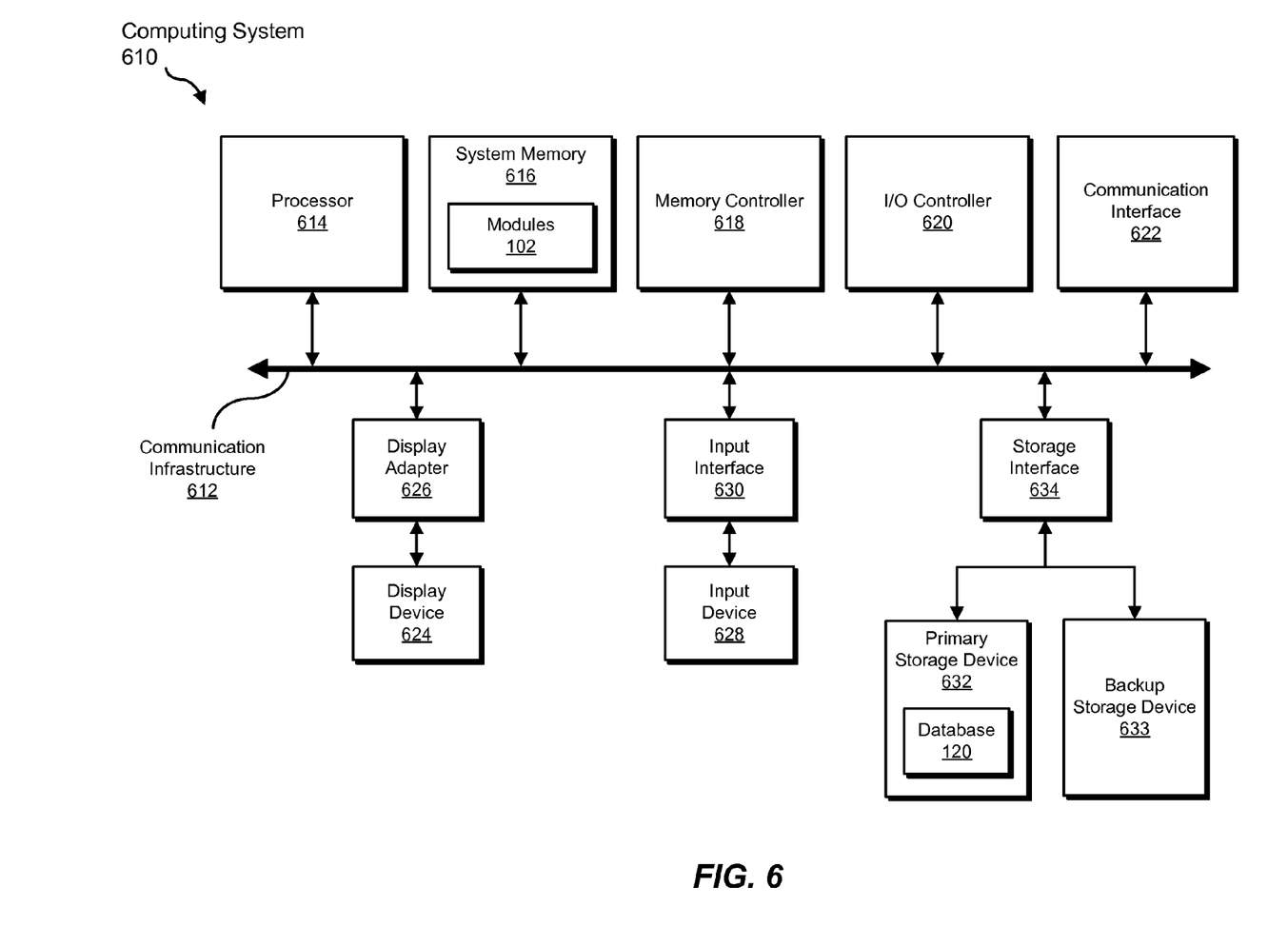
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the detecting, identifying, comparing, determining, performing, calculating, classifying, preventing, and/or notifying steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632. In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
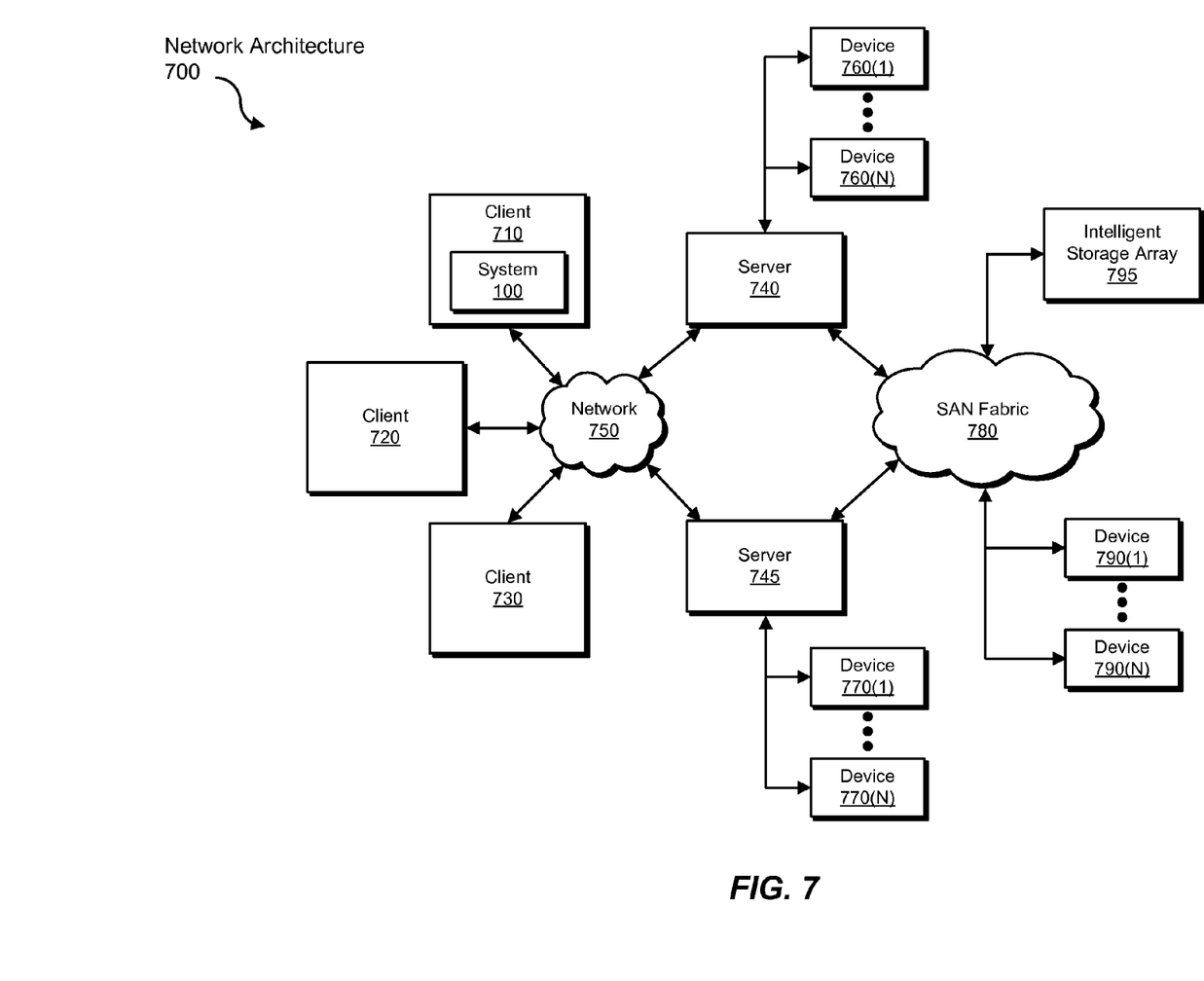
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the detecting, identifying, comparing, determining, performing, calculating, classifying, preventing, and/or notifying steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for detecting malicious digitally-signed applications.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing system into a system capable of detecting malicious digitally-signed applications.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for detecting malicious digitally-signed applications, the method comprising:

identifying an unknown application package file that has been digitally signed, wherein the unknown application package file is used to distribute an application;

comparing the unknown application package file to a set of known application package files;

determining, based on the comparison of the unknown application package file to the set of known application package files, that the unknown application package file has been repackaged from a known application package file by identifying a similarity between the unknown application package file and the known application package file;

determining, in response to determining that the unknown application package file has been repackaged from the known application package file, that the unknown application package file was not digitally signed with a private key used to digitally sign the known application package file by:

comparing a public key associated with a digital signature of the unknown application package file to a public key associated with a digital signature of the known application package file;

determining, based on the comparison of the public keys, that the public key associated with the digital signature of the unknown application package file does not match the public key associated with the digital signature of the known application package file;

determining, based at least in part on determining that the unknown application package file was not digitally signed with the private key used to digitally sign the known application package file, that the unknown application package file was not legitimately repackaged, but was maliciously repackaged from the known application package file;

performing, in response to determining that the unknown application package file was not legitimately repackaged, but was maliciously repackaged from the known application package file, a security action on the application;

wherein at least a portion of the method is performed by a computing device comprising at least one hardware processor.

2. The method of claim 1, wherein:

comparing the unknown application package file to the set of known application package files comprises comparing at least one attribute of the unknown application package file with at least one attribute of the known application package file;

determining that the unknown application package file has been repackaged from the known application package file comprises determining that the attribute of the unknown application package file is similar to the attribute of the known application package file.

3. The method of claim 2, wherein determining that the attribute of the unknown application package file is similar to the attribute of the known application package file comprises:

calculating, based at least in part on the comparison of the attribute of the unknown application package file with the attribute of the known application package file, a similarity score that indicates a degree of similarity between the attribute of the unknown application package file and the attribute of the known application package file;

determining that the similarity score is greater than a predetermined similarity threshold.

4. The method of claim 2, wherein the attribute of the unknown application package file comprises at least one of:

a name of the application;
a name of the unknown application package file;
a package name of the application;
a name of an activity of the application;
a name of a class of the application;
an attribute of a file contained within the unknown application package file;
a name of a resource file contained within the unknown application package file;
a size of a resource file contained within the unknown application package file;
a hash of a resource file contained within the unknown application package file;
a number of resource files contained within the unknown application package file;
a size of a plurality of resource files contained within the unknown application package file;
a number of class files contained within the unknown application package file;
a size of a plurality of class files contained within the unknown application package file.

5. The method of claim 1, wherein performing the security action on the application comprises at least one of:

performing a security action on the unknown application package file;
performing a security action on the public key associated with the unknown application package file;
performing a security action on at least one additional application that has been signed using a private key associated with the public key associated with the unknown application package file.

6. The method of claim 1, wherein performing the security action on the application comprises at least one of:

classifying the application as potentially malicious;
preventing an installation of the application;
notifying a user, who is attempting to install the application, that the application is potentially malicious;
notifying a third-party that the application is potentially malicious.

7. The method of claim 1, wherein the unknown application package file comprises at least one of:

an ANDROID application package file;
a JAVA archive file;
a ZIP file.

8. A system for detecting malicious digitally-signed applications, the system comprising:

an identification module programmed to identify an unknown application package file that has been digitally signed, wherein the unknown application package file is used to distribute an application;

a file-comparing module programmed to compare the unknown application package file to a set of known application package files;

a similarity-determining module programmed to, based on the comparison of the unknown application package file to the set of known application package files, determine that the unknown application package file has been repackaged from a known application package file by identifying a similarity between the unknown application package file and the known application package file;

a key-comparing module and a difference-determining module programmed to, in response to determining that the unknown application package file has been repackaged from the known application package file, determine that the unknown application package file was not digitally signed with a private key used to digitally sign the known application package file by:
comparing a public key associated with a digital signature of the unknown application package file to a public key associated with a digital signature of the known application package file;
determining, based on the comparison of the public keys, that the public key associated with the digital signature of the unknown application package file does not match the public key associated with the digital signature of the known application package file;
a security module programmed to:
determine, based at least in part on the unknown application package file having not been digitally signed with the private key used to digitally sign the known application package file, that the unknown application package file was not legitimately repackaged, but was maliciously repackaged from the known application package file;
perform, in response to determining that the unknown application package file was not legitimately repackaged, but was maliciously repackaged from the known application package file, a security action on the application;
at least one hardware processor configured to execute the identification module, the file-comparing module, the similarity-determining module, the key-comparing module, the difference-determining module, and the security module.

9. The system of claim 8, wherein:
the file-comparing module is programmed to compare the unknown application package file to the set of known application package files by comparing at least one attribute of the unknown application package file with at least one attribute of the known application package file;
the similarity-determining module is programmed to determine that the unknown application package file has been repackaged from the known application package file by determining that the attribute of the unknown application package file is similar to the attribute of the known application package file.

10. The system of claim 9, wherein the similarity-determining module is programmed to determine that the attribute of the unknown application package file is similar to the attribute of the known application package file by:
calculating, based at least in part on the comparison of the attribute of the unknown application package file with the attribute of the known application package file, a similarity score that indicates a degree of similarity between the attribute of the unknown application package file and the attribute of the known application package file;
determining that the similarity score is greater than a predetermined similarity threshold.

11. The system of claim 9, wherein the attribute of the unknown application package file comprises at least one of:
a name of the application;
a name of the unknown application package file;
a package name of the application;
a name of an activity of the application;
a name of a class of the application;
an attribute of a file contained within the unknown application package file;
a name of a resource file contained within the unknown application package file;
a size of a resource file contained within the unknown application package file;
a hash of a resource file contained within the unknown application package file;
a number of resource files contained within the unknown application package file;
a size of a plurality of resource files contained within the unknown application package file;
a number of class files contained within the unknown application package file;
a size of a plurality of class files contained within the unknown application package file.

12. The system of claim 8, wherein the security module is programmed to perform the security action on the application by performing at least one of:
a security action on the unknown application package file;
a security action on the public key associated with the unknown application package file;
a security action on at least one additional application that has been signed using a private key associated with the public key associated with the unknown application package file.

13. The system of claim 8, wherein the security module is programmed to perform the security action on the application by performing at least one of:
classifying the application as potentially malicious;
preventing an installation of the application;
notifying a user, who is attempting to install the application, that the application is potentially malicious;
notifying a third-party that the application is potentially malicious.

14. The system of claim 8, wherein the unknown application package file comprises at least one of:
an ANDROID application package file;
a JAVA archive file;
a ZIP file.

15. A non-transitory computer-readable-storage medium comprising one or more computer-executable instructions that, when executed by at least one processor of a computing device, cause the computing device to:
identify an unknown application package file that has been digitally signed, wherein the unknown application package file is used to distribute an application;
compare the unknown application package file to a set of known application package files;
determine, based on the comparison of the unknown application package file to the set of known application package files, that the unknown application package file has been repackaged from a known application package file by identifying a similarity between the unknown application package file and the known application package file;
determine, in response to determining that the unknown application package file has been repackaged from the known application package file, that the unknown application package file was not digitally signed with a private key used to digitally sign the known application package file by:
comparing a public key associated with a digital signature of the unknown application package file to a public key associated with a digital signature of the known application package file;
determining, based on the comparison of the public keys, that the public key associated with the digital signature of the unknown application package file does not match the public key associated with the digital signature of the known application package file;

determine, based at least in part on determining that the unknown application package file was not digitally signed with the private key used to digitally sign the known application package file, that the unknown application package file was not legitimately repackaged, but was maliciously repackaged from the known application package file;

perform, in response to determining that the unknown application package file was not legitimately repackaged, but was maliciously repackaged from the known application package file, a security action on the application.

16. The computer-readable-storage medium of claim 15, wherein the one or more computer-executable instructions are programmed to cause the computing device to:

compare the unknown application package file to the set of known application package files by comparing at least one attribute of the unknown application package file with at least one attribute of the known application package file;

determine that the unknown application package file has been repackaged from the known application package file by determining that the attribute of the unknown application package file is similar to the attribute of the known application package file.

17. The computer-readable-storage medium of claim 16, wherein the one or more computer-executable instructions are programmed to cause the computing device to determine that the attribute of the unknown application package file is similar to the attribute of the known application package file by:

calculating, based at least in part on the comparison of the attribute of the unknown application package file with the attribute of the known application package file, a similarity score that indicates a degree of similarity between the attribute of the unknown application package file and the attribute of the known application package file;

determining that the similarity score is greater than a predetermined similarity threshold.

18. The computer-readable-storage medium of claim 15, wherein the one or more computer-executable instructions are programmed to cause the computing device to perform the security action on the application by performing at least one of:

a security action on the unknown application package file;

a security action on the public key associated with the unknown application package file;

a security action on at least one additional application that has been signed using a private key associated with the public key associated with the unknown application package file.

19. The computer-readable-storage medium of claim 15, wherein the one or more computer-executable instructions are programmed to cause the computing device to perform the security action on the application by performing at least one of:

classifying the application as potentially malicious;

preventing an installation of the application;

notifying a user, who is attempting to install the application, that the application is potentially malicious;

notifying a third-party that the application is potentially malicious.

20. The computer-readable-storage medium of claim 15, wherein the unknown application package file comprises at least one of:

an ANDROID application package file;

a JAVA archive file;

a ZIP file.

* * * * *